(12) United States Patent
Deiss

(10) Patent No.: US 8,551,594 B2
(45) Date of Patent: *Oct. 8, 2013

(54) SEALING TAPE FOR SEALING A JOINT

(75) Inventor: Martin Deiss, Abtsgmeund (DE)

(73) Assignee: ISO-Chemie GmbH (DE)

( * ) Notice: Subject to any disclaimer, the term of this patent is extended or adjusted under 35 U.S.C. 154(b) by 447 days.

This patent is subject to a terminal disclaimer.

(21) Appl. No.: 12/524,628

(22) PCT Filed: Feb. 6, 2008

(86) PCT No.: PCT/EP2008/000918
§ 371 (c)(1),
(2), (4) Date: Jul. 27, 2009

(87) PCT Pub. No.: WO2008/098699
PCT Pub. Date: Aug. 21, 2008

(65) Prior Publication Data
US 2010/0047548 A1    Feb. 25, 2010

(30) Foreign Application Priority Data
Feb. 14, 2007   (EP) .................................... 07003099

(51) Int. Cl.
*B32B 7/12* (2006.01)
*B32B 3/10* (2006.01)

(52) U.S. Cl.
USPC ...... 428/40.1; 428/41.8; 428/343; 428/317.3; 428/131; 428/71

(58) Field of Classification Search
None
See application file for complete search history.

(56) References Cited

U.S. PATENT DOCUMENTS

| | | | | |
|---|---|---|---|---|
| 4,204,373 A | * | 5/1980 | Davidson | 52/204.1 |
| 4,509,999 A | * | 4/1985 | Sandor | 156/71 |
| 5,072,952 A | * | 12/1991 | Irrgeher et al. | 277/652 |
| 5,489,468 A | * | 2/1996 | Davidson | 442/374 |
| 6,672,597 B1 | * | 1/2004 | Irrgeher et al. | 277/650 |

FOREIGN PATENT DOCUMENTS

| | | |
|---|---|---|
| DE | 10104992 A1 | 8/2002 |
| EP | 0530653 A1 | 8/1992 |
| EP | 1131525 B2 | 9/2001 |
| WO | WO 9845565 A1 * | 10/1998 |

\* cited by examiner

*Primary Examiner* — Maria Veronica Ewald
*Assistant Examiner* — Chinessa Adkins
(74) *Attorney, Agent, or Firm* — Jansson Munger McKinley & Shape Ltd.

(57) ABSTRACT

A sealing tape for sealing a joint has an elastically expanding foam strip of approximate rectangular cross section and a foil-type wrapping at least partially surrounding the foam strip. Foil wrapping holds the foam strip in a compressed state and comprises a tear-open tab extending in the longitudinal direction of the sealing tape for opening the wrapping to allow the foam strip to expand, and includes an adhesive tape located in the area of the bottom surface of the foam strip. The wrapping surrounds the two lateral surfaces and the top surface of the foam strip, has a first edge strip, which covers a first edge area of the bottom surface of the foam strip, and a second edge strip, which covers a second edge area of the bottom surface of the foam strip opposite the first edge area. The adhesive tape is bonded adhesively to the two edge strips and holds them in place but can be separated from them by pulling. The adhesive tape adheres at least in the middle area of the bottom surface of the foam strip directly to the foam strip.

16 Claims, 2 Drawing Sheets

SEALING TAPE FOR SEALING A JOINT

FIELD

The present invention pertains to a sealing tape for sealing a joint, such as that between a frame profile of a window or door and the wall of a building.

BACKGROUND

A sealing tape of this type is known from, for example. EP 1 131 525 B1. The known sealing tape consists of an elastically expanding foam strip of rectangular cross section, which, in the compressed state, is completely surrounded by a wrapping. The wrapping consists of a sheet of plastic, which also forms a tear-open lab extending in the longitudinal direction of the sealing tape. The plastic sheet is bonded to itself to form a predetermined tear site. To hold the foam strip in place inside the pocket formed in this way, the strip is bonded to the wrapping. The wrapping in turn can be attached to a frame profile by means of separate adhesive means, such as double-sided adhesive tape.

Sealing tapes of this type are bonded to the frame profile to be sealed. After the frame profile has been installed in the rough opening in the wall of the building, the wrapping is torn open to allow the foam strip to recover elastically. Such recovery seals off the frame profile against the wall.

In the case of the known sealing tapes, however, after the wrapping has been torn open, a portion of the wrapping material necessarily remains on the structure, particularly, the part located between the frame profile and the foam strip. This is often undesirable.

A sealing strip for attachment to a window frame is known from EP 0 530 653 B1. This strip consists of a rigid channel with a U-shaped cross section and an elastically compressed foam strip arranged therein. The channel is closed off by a dimensionally stable cover strip, which is held in detachable, positively-engaging connection with the from region of the channel walls. The cover strip is connected in a banner-like manner to a limp strip element, which is guided over one edge of the cover strip and into the channel of the sealing strip. By pulling on the limp strip element, the cover strip can be detached from the channel, so that the compressed foam strip can expand. This design is extremely complicated.

A sealing tape which consists of a surface strip for attachment to a frame profile with a foam strip arranged on top of the surface strip is described in U.S. Pat. No. 4,204,373. The foam strip is covered by a foil of paper or plastic, which is adhered to the surface strip and holds the foam strip in the compressed state. Rip cords extend along the edge of the cover sheet and can be used to tear open the foil after the frame profile equipped with the sealing tape has been installed in the building structure.

SUMMARY

It is an object of the present invention to provide a sealing tape of the type indicated above which is simple in design and which allows the wrapping to be removed either completely, without residue, or to only a predetermined extent from the foam strip.

According to an aspect of the present invention, the sealing tape includes an elastically expanding foam strip having two lateral surfaces, a bottom surface and a top surface. A foil-type wrapping for holding the foam strip in a compressed state is included which wrapping surrounds the two lateral surfaces and the top surface of the foam strip. The foil-type wrapping comprises a first edge strip, which covers a first edge area of the bottom surface of the foam strip, and a second edge strip, which covers a second edge area of the bottom surface of the foam strip opposite the first edge area. The foil-type wrapping also includes a tear-open tab extending in a longitudinal direction of the sealing tape for opening the wrapping to allow the foam strip to expand. An adhesive tape arranged adjacent to the bottom surface of the foam strip is included and is bonded adhesively to the first and second edge strips holding them in place but can be separated from them by pulling. The adhesive tape adheres at least in a middle area of the bottom surface of the foam strip directly to the foam strip.

In one embodiment of the present invention, the wrapping does not completely surround the foam strip but rather leaves a strip-like middle section free on the bottom surface of the foam strip. This middle section is adhered to the frame profile before the wrapping is pulled off. The adhesive tape adheres directly to this middle area of the foam strip. In addition, the adhesive tape also holds the edge strips of the wrapping lying on the bottom surface of the foam strip firmly in place preventing the foam strip from expanding in this direction. In use, the sealing tape is first adhered to the frame profile element. The adhesive tape is preferably a double-sided tape, that is, a tape provided on both sides with an adhesive layer or an adhesive coating. Then the wrapping is removed from the sealing tape by pulling on the tear-open tab. As a result the edge strips of the wrapping held by the adhesive layer are detached without any tearing of the material. Only the previously mentioned adhesive bonds are broken, so that the wrapping can be removed completely without leaving any residue behind.

BRIEF DESCRIPTION OF THE DRAWINGS

The invention is explained in greater detail below on the basis of the embodiments shown in the drawings.

DETAILED DESCRIPTION

Figure 1:
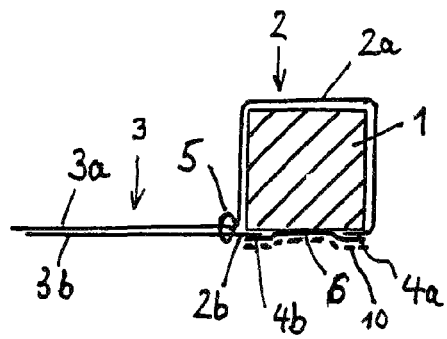
FIG. 1 is a cross-sectional view of a first embodiment of the sealing tape for sealing a joint according to the invention.

In the drawings, the wrappings, adhesive tapes, and silicone papers are shown a certain distance away from the foam body, so that it is easier to distinguish from each other the individual elements which form the sealing tape. In reality, these elements lie directly on top of each other or on the compressed foam strip, because the pressure of the strip causes it to rest tightly against the wrapping.

FIG. 1 shows a foam strip 1, which, in the present example, has a rectangular cross section and which, in the compressed state, is surrounded by both a wrapping, designated overall by the number 2, and a double-sided adhesive tape 6. Foam strip 1 can be formed out of any desired open-cell or closed-cell soft foam, e.g., polyurethane or polyethylene, and can be impregnated to delay its reexpansion. A multilayer arrangement of several different foam materials laminated successively to each other is also conceivable. An arrangement of an impregnated foam layer on a foam layer which is not impregnated is also contemplated.

Wrapping 2 has a first section 2a and a second section 2b. In the embodiment shown. This section 2a covers the two lateral surfaces and the top surface of foam strip 1, and a first edge strip 4a is folded over onto an edge area of the bottom surface of foam strip 1. On the opposite side, a first extension strip 3a of first section 2a of wrapping 2 projecting from foam strip 1 forms part of a tear-open tab, designated overall by the number 3.

The other edge of the bottom surface of foam strip 1 is covered by a second edge strip 4b of second section 2b of wrapping 2. From there, a second extension strip 3b extends laterally, parallel to the previously mentioned first extension strip 3a, and forms another part of the tear-open tab 3. First and second sections 2a and 2b of wrapping 2 are held together near foam strip 1 by a seam, which is symbolized in FIG. 1 by the number 5, and which can be a welded seam, a glued seam, or a sewn seam.

The middle area of adhesive tape 6, which serves to attach the sealing tape to a structural element to be installed, such as a frame profile, is attached directly to the bottom surface of foam strip 1. The downward-facing, outside surface of the adhesive tape 6 is preferably kept covered by a piece of removable silicone paper 10 or the like, shown in broken line, until the sealing tape is to be attached to the structural element. The edge areas of adhesive tape 6 cover edge strips 4a, 4b of wrapping 2 located on the bottom surface of foam strip 1 and hold them in place. The adhesive bond is sufficiently strong to resist the recovery force generated by foam strip 1 in the compressed state, but at the same time it is weak enough that it can yield to a pulling force. Such a pulling force is applied after the sealing tape has been attached to a structural element and tear-open tab 3 is pulled. The edges of edge strips 4a, 4b can also have a zigzag shape or a wave shape.

It should be emphasized at this point that, in practice, adhesive tape 6 is very often realized by a layer of adhesive, which has been applied to a piece of silicone paper or the like, which is then laminated in this form to a web of foamed plastic material. In some cases, a scrim or a support film, nonwoven fabric, or the like can also be embedded in this adhesive layer to increase the tensile strength. The expression "adhesive tape" used above should therefore also comprise adhesive layers of the type described here.

The sealing tape according to another preferred embodiment, including adhesive tape 6 and silicone paper 10, may be wound up into a wide roll, and this sealing tape roll is then cut into disks for further processing. The wrapping is usually applied after the sealing tape has been unwound from the roll. So that the foam strip can be kept in the compressed form, either the delayed reexpansion property of an impregnated foam is used, or the foam is kept compressed mechanically. Then the compressed sealing tape is wound up again together with the wrapping, e.g., onto a spool or again into a disk-like roll of sealing tape.

Figure 2:
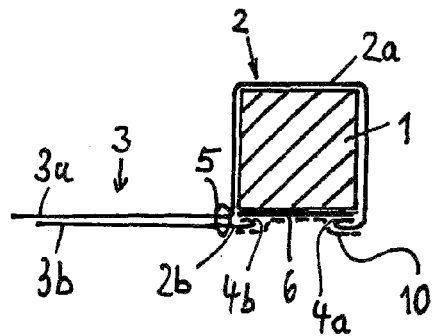
FIG. 2 is a cross-sectional view of a second embodiment of the sealing tape for sealing a joint according to the invention.

FIG. 2 shows a second embodiment of the sealing tape according to the invention. It differs from that of FIG. 1 in that adhesive tape 6 is attached directly to foam strip 1 over the entire bottom surface of foam strip 1, and edge strips 4a, 4b of first and second sections 2a and 2b of wrapping 2 are folded over toward the inside, so that they lie between the edge areas of adhesive tape 6 and silicone paper 10. The edge areas of silicone paper 10 covering adhesive tape 6 thus also cover edge strips 4a, 4b of wrapping 2, and because they merely rest on edge strips 4a, 4b without adhering to them, they form release tabs on each side. This makes it easier to separate silicone paper 10 from adhesive tape 6, and this in turn simplifies the handling of the sealing tape even more before it is attached to a structural element.

In this embodiment, the two edge strips 4a, 4b can, of course, simply be attached to the edge areas of the adhesive tape 6 in the same way as that shown in FIG. 1. The folding-over of edge strips 4a, 4b, however, offers the advantage that, when pulled, edge strips 4a, 4b, will come away from adhesive tape 6 by a peeling type action requiring a reduced amount of pulling force.

Figure 3:
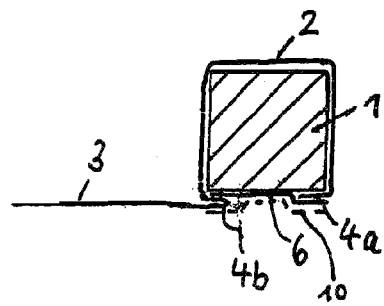
FIG. 3 is a cross-sectional view of a third embodiment of the sealing tape for sealing a joint according to the invention.

FIG. 3 shows a third embodiment of the sealing tape according to the invention, which differs from that of FIG. 1 in that wrapping 2 is in one piece and therefore is provided here only with the reference number 2 without suffixes. Wrapping 2 is guided around both lateral surfaces and the top surface of foam strip 1, and its first edge strip 4a is again folded under the bottom surface of foam strip 1. On the opposite edge of the bottom surface of foam strip 1, second edge strip 4b of wrapping 2 is guided under foam strip 1 and then folded over to form a tear-open tab 3 projecting from foam strip 1. The middle area of the bottom surface of foam strip 1 is again covered by adhesive tape 6, which extends from the middle over first edge strip 4a and also over second double-layer edge strip 4b, thus holding wrapping 2 in place adhesively to keep foam strip 1 in the compressed state.

When, in the case of this embodiment of the invention, it is desired to remove wrapping 2, it is necessary merely to pull on tear-open tab 3. As a result, edge strip 4b is released from adhesive tape 6 first, and then edge strip 4a can also be released from its bond to adhesive tape 6.

In the case of the embodiment according to FIG. 3 as well, adhesive tape 6 could be attached directly to the entire bottom surface of foam strip 1 as in the case of FIG. 2, whereas edge strips 4a, 4b would now be arranged between adhesive tape 6 and silicone paper 10. This also applies to all of the following embodiments.

Figure 4:
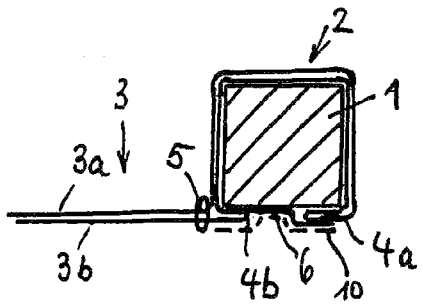
FIG. 4 is a cross-sectional view of a fourth embodiment of the sealing tape for sealing a joint according to the invention.

FIG. 4 shows a fourth embodiment of the invention, which differs from the embodiment of FIG. 3 in that first edge strip 4a of wrapping 2 is folded over by 180° and guided back across the top surface of foam strip 1, thus forming a double-layer wrapping. The returned section is used to form an extension strip 3a and is connected in the area of second edge strip 4b (i.e., at the point marked 5) to extension strip 3b. Extension strip 3a extends from point 5 by means of, for example, welding, adhesive bonding, sewing or the like, as a result of which double-layer tear-open tab 3 is formed. The advantage of this embodiment is that wrapping 2 can consist of a single piece of material, wherein the thickness of the wrapping material can also be reduced. In addition, it is easier to remove the wrapping material in the area of the first edge strip 4a, because, after the release of wrapping 2, the inner layer of edge strip 4a facilitates the peeling of the material from the adhesion site.

Figure 5:
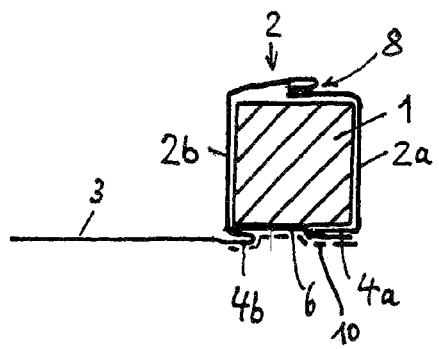
FIG. 5 is a cross-sectional view of a fifth embodiment of the sealing tape for sealing a joint according to the invention.

FIG. 5 shows a fifth embodiment of the invention. Wrapping 2 has a first section 2a, which completely covers a first lateral surface of foam strip 1 and about half of its top surface. First section 2a has a first edge strip 4a, which lies under foam strip 1. An edge area of a second section 2b is adhered to an adhesive bead 8 extending in the longitudinal direction of the sealing tape along the edge of first section 2a lying on the top surface of the foam strip 1. This second section 2b is then preferably folded over. Second section 2b completes the coverage of the top surface of foam strip 1. It also covers the other lateral surface of foam strip 1 and, as in the case of the embodiment of FIG. 3, is guided under foam strip 1, where its edge strip 4b, together with first edge strip 4a, is covered by adhesive tape 6. Second section 2b of the wrapping simultaneously forms a tear-open tab 3 projecting laterally from foam strip 1.

To remove the wrapping, the user simply pulls on tear-open tab 3. The adhesive bond to edge strip 4b lying under foam strip 1 is released as a result. Upon further pulling of tear-open tab 3, second section 2b of wrapping 2 peels away from first section 2a along adhesive bead 8 between two sections 2a and 2b of the wrapping, so that second section 2b of the wrapping can be removed completely from foam strip 1. First section 2a remains behind. When suitable wrapping material is used, the remaining section can be used for special protective measures to protect the lateral surface of the sealing tape, e.g., as a vapor barrier. Other functions of the remaining part of the wrapping are also conceivable. For example, it could serve as a UV barrier to protect foam strip 1 or as a colored covering for decorative purposes on the building structure.

As an alternative to adhesive bead 8 it is also possible to form two sections 2a and 2b as integral parts of each other and to provide a tear-open perforation in the area where adhesive bead 8 is located in FIG. 5. After edge strip 4b has been detached by pulling on tear-open tab 3, wrapping 2 then comes apart at the perforation just mentioned, which, again, leaves section 2a behind on the sealing tape.

In the case of the last two variants, adhesive tape 6, if desired, can lie under the edge strip on only one side, i.e., under edge strip 4b on the side shown on the left in the drawing. Edge strip 4b is then covered by silicone paper 10 in the same way as is performed in the embodiment of FIG. 2, which makes it easier to pull wrapping 2 from the sealing tape.

Figure 6:
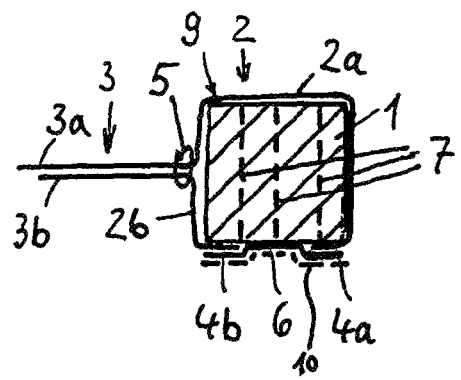
FIG. 6 is a cross-sectional view of a sixth embodiment of the sealing tape for sealing a joint according to the invention.

FIG. 6 shows a sixth embodiment of the sealing tape according to the invention. This variant differs from that of FIG. 1 in that first section 2a of wrapping 2 covers only about half of the lateral surface of foam strip 1 on the side where tear-open tab 3 is located. Second section 2b of wrapping 2 covers the other half of this lateral surface and is connected to first section 2a along a seam 5, which lies approximately at mid-height of foam strip 1. The procedure for removing wrapping 2 from foam strip 1 is comparable to that of the embodiment according to FIG. 1.

As can be seen in FIG. 6, seams may be made with threads 7, which preferably form seams in the longitudinal direction of foam strip 1 and pass through the foam from top to bottom. Such seams hold foam strip 1 in the compressed state and thus ensure that foam strip 1 has in the compressed state, a cross section which is as rectangular as possible. In addition, the force acting on wrapping 2 is weaker, so that the wrapping can be made thinner. The seams consisting of threads 7 are separated after wrapping 2 is opened, which, in the case of seams of this type, is very easy to do by pulling on one end of the thread, with the result that the material of foam strip 1 can return elastically to its original shape. It is also conceivable that, if the seams are also sewn through the wrapping foil, threads 7 would already have been separated previously, i.e., upon removal of wrapping 2. Threads 7 just mentioned can also be used in the embodiments according to FIGS. 1 to 5. Any desired type of single-thread or two-thread seams can be used.

In this context it should be noted that the embodiments shown in FIGS. 1 to 5 without such threads are illustrated in what amounts to an idealized form of the cross section of foam strip 1. In reality, the upper edges of foam strip 1 are pressed in more than the other surfaces of the foam strip by wrapping 2 and by the pressure acting from within, so that the cross section of foam strip 1 in the compressed state assumes a shape deviating from that of a rectangle. A certain outward bulging of foam strip 1 can also occur in the middle area of the bottom surface, so that overall a form resembling that of an oval will result.

It should be emphasized here that the material of wrapping 2 can be sheeting, a scrim, paper, or some other material suitable for the purpose cited. Laminated sheets, which consist of a plastic film laminated to a substrate (e.g., non-woven fabric), or fabric-reinforced sheets can also be used. All these materials are included in the expression "foil-type". Combinations of these materials are also possible, especially in the case of the embodiment of FIG. 5.

Another embodiment of the invention, which can be realized with a foam strip 1 and can either comprise seams with threads or not, is to be described now on the basis of FIG. 6. According to this variant, the wrapping comprises a longitudinal perforation line 9 on the top surface of the sealing tape, preferably in the area of the corner of the cross section of foam strip 1 located at the top left in FIG. 6. This perforation line is dimensioned in such a way that, when tear-open tab 3 is pulled, wrapping 2 tears along perforation line 9, so that the part of section 2a of wrapping 2 located to right in FIG. 6 remains behind on foam strip 1, whereas the other section 2b of wrapping 2 separates from its bond to the bottom surface of foam strip 1. After foam strip 1 has expanded, the part of wrapping 2 remaining on foam strip 1 can then cover one of its lateral surfaces and serve there again, for example, as a vapor barrier.

In this context it should be pointed out that, in practice, foam strips 1 are compressed to such an extent that, when they expand, they preferably can increase to approximately live or six times their thickness in the compressed state. Only about half of this expansion capacity, however, is actually used, so that it can be guaranteed that secure contact with the part of the building opposite the profile element to be sealed will be established. For example, upon realization of the variant of the invention with perforation line 9, the sides of a 20 mm-wide foam strip compressed to a thickness of 10 mm, which has expanded to a height of just about 30 mm after wrapping 2 has been torn open, will still be covered by section 2a of wrapping 2 remaining on the strip.

Even without a perforation line 9, it is possible (e.g., in the embodiment according to FIG. 3), to leave the entire wrapping 2 on foam strip 1 after the separation of edge strip 4b alone (edge strip 4a should remain firmly in place) to fulfill the functions described above. Wrapping 2 can also be removed completely from foam strip 1 and then adhered separately to the object to be sealed.

In such cases, a strip of pressure-sensitive adhesive (not shown), which can be covered by a piece of silicone paper, may be applied to the bottom surface of tear-open tab 3. This makes it easy to fasten tear-open tab 3 to an object such as masonry or to window glass in cases where tear-open tab 3 is intended to protect the window frame from being scratched during installation of the window in its frame.

Figure 7:
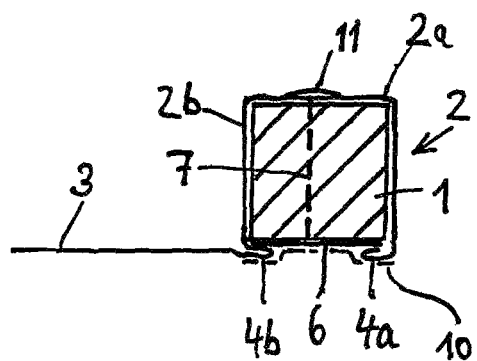
FIG. 7 is a cross-sectional view of a seventh embodiment of the sealing tape for sealing a joint according to the invention.

FIG. 7 shows a seventh embodiment of the invention with a one-piece wrapping 2, in which foam strip 1 is held together not only by wrapping 2 but also by at least one seam made with a thread 7, which, in the present case, is sewn through wrapping 2 and covered on the outside by a piece of single-sided adhesive tape 11. Thread 7 of the seam which crosses the foam material is dimensioned in such a way that it can be easily broken. A thread which links the loops of thread 7 together on the outside of wrapping 2 is dimensioned in such a way that it docs not break when wrapping 2 is torn off the sealing tape.

When tear-open tab 3 is pulled after this sealing tape has been attached to a structural element by means of adhesive tape 6, edge strip 4b is pulled away from adhesive tape 6 first. As the pulling continues, it then becomes possible to break thread 7 of the seam, so that foam strip 1 can begin to expand. Continued pulling on tear-open tab 3 has the result that the other edge strip 4a also comes away from the adhesive, so that wrapping 2 is now completely released from the sealing tape and foam strip 1 can recover and expand, without hindrance. Adhesive tape 11 holds sections 2a and 2b of the wrapping on the two sides of the seam together and also reinforces wrapping 2, which has been weakened at this point by the stitched seam. In another variant, adhesive tape 11 can be omitted.

The invention has been described above on the basis of the example of a foam strip 1 with a rectangular cross section for case of explanation herein. The term "rectangular" is also intended to include "square". One of ordinary skill will nevertheless see that the invention can be realized in a corresponding manner with foam strips 1 which have cross sections deviating from a rectangular shape. The cross-sectional shape of the foam strip 1 indicated here should therefore not be understood in a limiting sense, especially since foam strips 1 which were originally rectangular can be squeezed into a shape approximating an oval after a certain time by the pressure exerted by wrapping 2.

While the invention is shown in several forms and preferred embodiments, it is not limited to those embodiments illustrated, but is susceptible to various changes, and modifications without departing from the spirit and scope of the invention.

The invention claimed is:

1. A compressed sealing tape wound up into a roll and for sealing a joint between a structural element and an object surrounding the structural element, comprising:
    an elastically expanding foam strip having two lateral surfaces, a bottom surface and a top surface;
    a wrapping for holding the foam strip in a compressed state, which wrapping surrounds the two lateral surfaces and the top surface of the foam strip, comprises a first edge strip, which covers a first edge area of the bottom surface of the foam strip, and a second edge strip, which covers a second edge area of the bottom surface of the foam strip opposite the first edge area, so that the wrapping does not completely surround the foam strip but leaves a middle area free on the bottom surface of the foam strip, wherein the wrapping further comprises a tear-open tab extending in a longitudinal direction of the sealing tape for opening the wrapping to allow the foam strip to expand; and
    an adhesive tape, which serves to attach the sealing tape to the structural element, arranged adjacent to the bottom surface of the foam strip, wherein the adhesive tape is bonded adhesively to the first and second edge strips and holds them in place but can be separated from them by pulling, and wherein the adhesive tape adheres at least in the middle area of the bottom surface of the foam strip directly to the foam strip.

2. The sealing tape of claim 1 wherein the wrapping comprises two separate sections.

3. The sealing tape of claim 2 wherein the first section at least partially covers both lateral surfaces and the top surface of the foam strip, whereas the second section, which carries the second edge strip, covers the second edge area of the bottom surface of the foam strip.

4. The sealing tape of claim 3 wherein the first section and the second section each comprise an extension strip, which projects from the foam strip and participates in the formation of the tear-open tab, and the two extension strips are welded, adhesively bonded, or sewn along a seam line closely adjacent to the foam strip.

5. The sealing tape of claim 2 wherein the wrapping comprises a releasable adhesive site in the form of a bead extending in the longitudinal direction of the sealing tape, along which the first and second sections of the wrapping are adhered detachably to each other.

6. The sealing tape of claim 1 wherein the second edge strip is folded over onto itself.

7. The sealing tape of claim 1 wherein the wrapping is designed as a one-piece unit, and the second edge strip is folded over and extended to form the tear-open tab.

8. The sealing tape of claim 7 wherein the wrapping is designed with a double layer and comprises two extension strips, which are welded, adhesively bonded, or sewn along a seam line closely adjacent to the foam strip.

9. The sealing tape of claim 1 wherein the first edge strip is folded over onto itself.

10. The sealing tape of claim 1 wherein the wrapping is provided with a perforation line extending in the longitudinal direction of the sealing tape adjacent to the top surface of the foam strip.

11. The sealing tape of claim 1 wherein the foam strip is held in the compressed state under the wrapping by at least one breakable seam extending in the longitudinal direction of the sealing tape.

12. The sealing tape of claim 11 wherein the seam is made of at least one thread which also passes through the wrapping.

13. The sealing tape of claim 12 wherein the wrapping is covered above the seam by a second adhesive tape.

14. The sealing tape of claim 1 wherein the wrapping is formed at least in part by a fabric scrim.

15. The sealing tape of claim 1 wherein the adhesive tape is covered by a silicone paper.

16. The sealing tape of claim 15 wherein the adhesive tape adheres directly to the entire bottom surface of the foam strip, and the first and second edge strips of the wrapping are arranged between the adhesive tape and edge areas of the silicone paper.

* * * * *